Patented Nov. 24, 1936

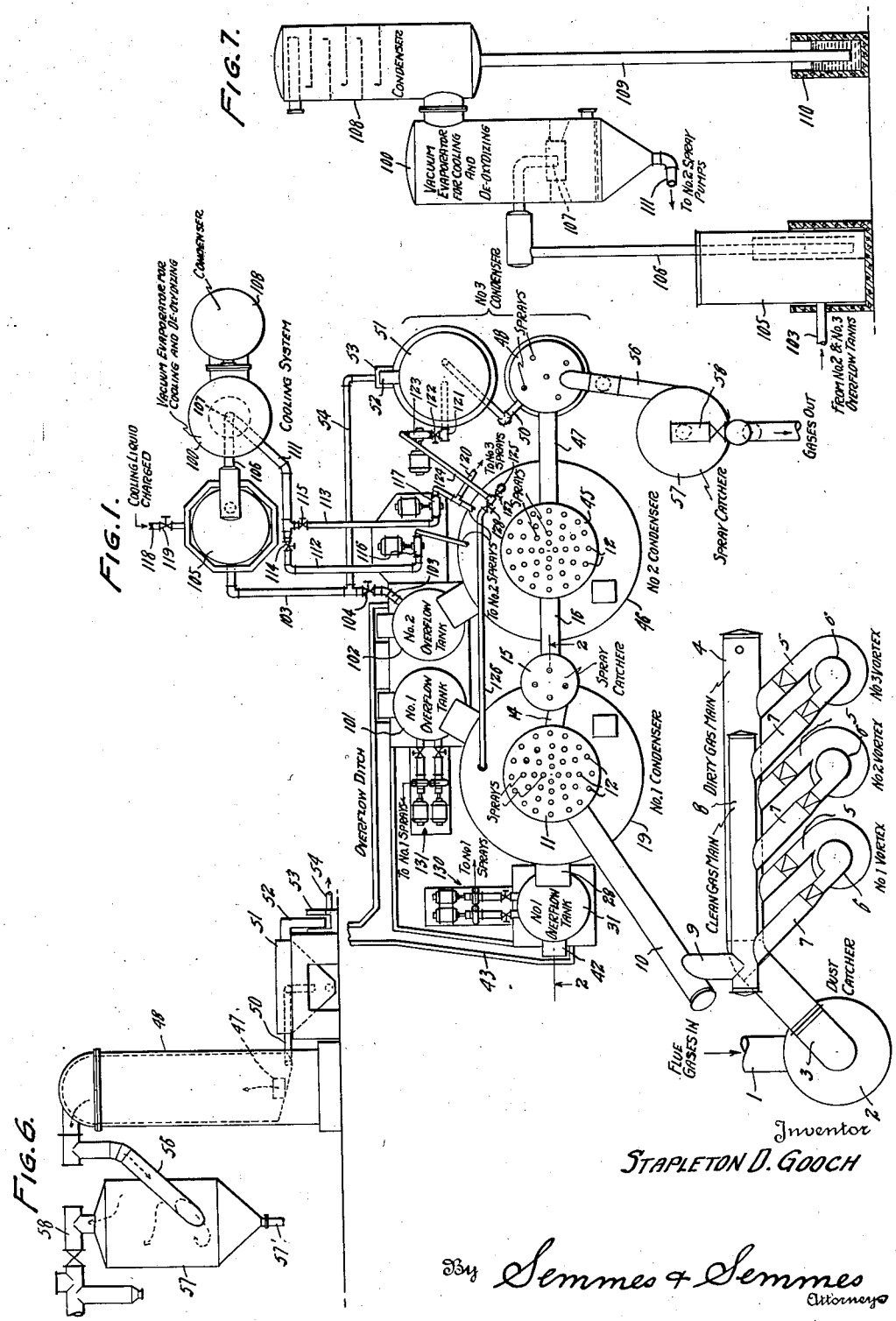

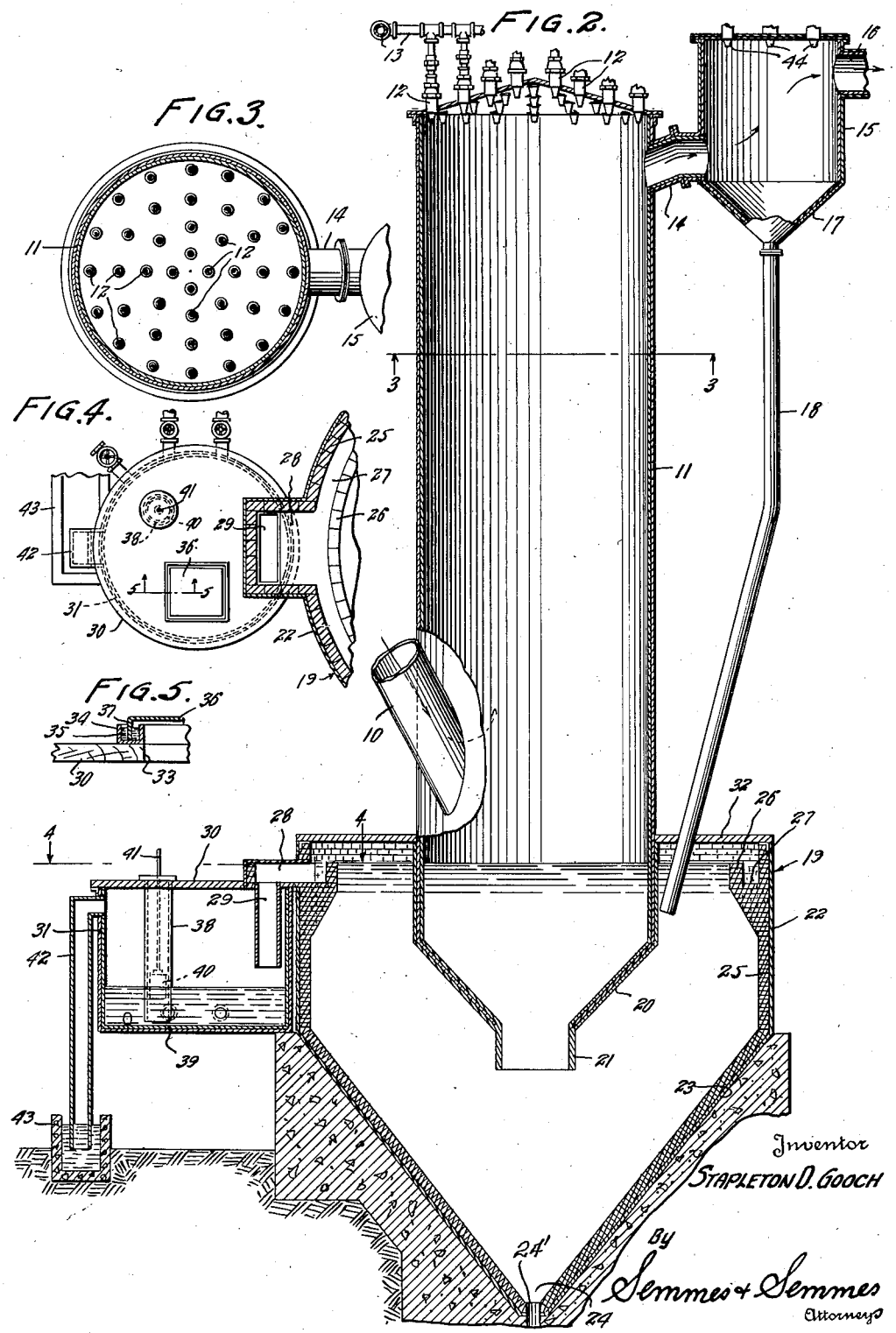

2,062,091

UNITED STATES PATENT OFFICE 2,062,091

APPARATUS FOR PHOSPHORUS RECOVERY

Stapleton D. Gooch, Pembroke, Fla.

Application March 23, 1935, Serial No. 12,693

8 Claims. (Cl. 261—111)

My invention relates to apparatus for the separation of phosphorus from furnace gases, and more particularly to the separation of phosphorus from blast furnace gases in which phosphorus vapors are relative dilute.

In the treatment of gases from blast furnaces containing phosphorus vapor to recover phosphorus, the large quantity of gases to be treated creates difficult problems. In condensing equipment which employs a cooling liquid having direct contact with the gases, because the gases are in such large volume, difficulties of construction are encountered. To handle large volumes of gas moving at relatively high velocity would ordinarily necessitate the employment of large condensing equipment units, which would be costly in installation and maintenance, and but partially efficient.

The smaller the size of the condensing equipment, the faster the flow of the condensing and cooling medium employed, and likewise the faster the flow of the gases to be treated. When these factors are considered together with the prime necessity of preventing access of oxygen to the cooling liquid, the difficulties of constructing efficient small condensing equipment can be readily appreciated.

It is an object of my invention to provide a spray chamber, receiving tank, overflow tank and spray catcher equipment which may be constructed at small cost, and is of high efficiency in handling large volumes of gas in a short period of time.

It is a further object of my invention to provide equipment for the condensation of phosphorus which is safe in operation, and which will maintain a high degree of efficiency in obtaining phosphorus from a dilute vaporous form in furnace or flue gases.

With these and other objects in view, my invention consists in the parts and combinations to be hereinafter set forth and claimed, with the understanding that the several necessary elements may be varied in proportions and arrangements without exceeding the scope of the appended claims.

In order to more fully explain my invention, I have shown in the accompanying drawings certain constructions which may be subject to modification without avoiding the spirit of the invention, but which are illustrative and explanatory of one mode of applying my invention.

In the drawings:

Figure 1 is a diagrammatic illustration of my phosphorus condensing system;

Fig. 2 is a cross sectional view taken through the axis of the first condenser, showing the spray catcher partly in section, and the receiving tank and the overflow tank in section;

Fig. 3 is a view taken along the line 3—3 of Figure 2, looking in the direction of the arrows;

Fig. 4 is a view taken along the line 4—4 of Figure 2, looking in the direction of the arrows;

Fig. 5 is a detail view taken along the line 5—5 of Figure 4, looking in the direction of the arrows;

Fig. 6 is a view in side elevation diagrammatically showing the arrangement of the third condenser and the spray catcher therefor;

Fig. 7 is a view in side elevation diagrammatically showing the cooling system.

In the drawings, most of the showings have been made diagrammatically in order to avoid unnecessary details of the showings made of standard parts of apparatus which are familiar to those skilled in the art.

The flue gases of the phosphorus furnace which are rich in phosphorus, which is in vapor form, enter a conduit 1 and pass to a dust catcher 2 where a large portion of the dust settles. From the top of the dust catcher is a conduit 3 which leads to a dirty gas main 4 which is a header. From the dirty gas main 4 are conduits 5 which lead to three vortex cleaners 6. These cleaners are of the cyclone type and are arranged in parallel. Here the gas, which still contains a considerable amount of dust, is cleaned by centrifugal action. From the three vortex or cyclone type cleaners the gas, which is now relatively dust free, passes to conduits 7 and into a clean gas main 8, which serves as a header for the conduits 7.

From the clean gas main 8 the phosphorus-containing vapors pass to a conduit 9 which connects with a conduit 10.

The temperature of the flue gases which entered the conduit 1 has now been quickly reduced to a point above the dew point of the phosphorus vapor, but below that temperature at which there will be any marked tendency for the phosphorus to assume the allotropic red form.

From the conduit 10 the flue gases containing the phosphorus vapors pass into the lower end of a cylindrical spray chamber 11 where they are subjected to a number of streams of coarse spray of a cooling liquid which enter through nozzles 12 fed by pipes 13. The volume of phosphorus-containing gas that passes into the spray chamber 11 is large, and the volume of water which comes from the nozzles 12 is also great. The speed of movement of the gases and the water is relatively high.

At the upper part of the spray chamber 11 is an outlet passage 14 through which are adapted to pass the gases with entrained moisture in droplet form, as well as the phosphorus vapor which has not been condensed in this first condenser. The conduit 10 is located on the opposite side of the spray chamber 11 from the outlet conduit 14, and the entrance points of the two conduits into the spray chamber are separated practically by the length of this chamber. This permits the volume of gas to be subjected to a thorough spraying in its travel throughout the length of the chamber.

From the outlet passage 14 the mixed gases and vapors together with the entrained droplets of cooling liquid, which may be a slightly acidulated aqueous solution, pass into a spray catching tank 15 which is provided with an outlet 16. It is to be noted that the conduit 14 delivers the stream of gases and vapors together with the entrained droplets of cooling liquid substantially tangentially against the interior walls of the spray catching tank 15, and that the conduit 14 and the conduit 16 are located, respectively, near the bottom and the top of the spray catching tank 15. The whirling motion of the material delivered by the conduit 14, causes it to impinge against the side walls of the tank 15, tending to deposit the droplets of cooling liquid against the walls.

Because of the staggered relationship of the conduits 14 and 16, the material delivered into the tank 15 must pass through a tortuous path before it arrives at the conduit 16, thus tending to precipitate the droplets. In this spray catching chamber 15 is deposited a large portion of the entrained droplets which fall into a conical bottom 17 and pass into a conduit 18 from which the cooling liquid is delivered into a receiving tank 19 at a point below the surface of the cooling liquid in the receiving tank. The outlet of the conduit 18 is sufficiently below the surface of the cooling liquid in the receiving tank 19 so that the pressure of the gases and vapors in the apparatus shall not be sufficient to permit a bubbling of such gases and vapors from the lower end of the conduit 18.

The spray chamber 11 is provided with a conical bottom 20 having an outlet 21 located at the apex of the inverted cone which forms this bottom. Chamber 11 is so located with respect to the liquid level in the receiving tank 19 that the pressure of gases and vapors in the system shall not be sufficient to cause the liquid in the lower end of the spray chamber 11 to fall below the base of the inverted cone 20 which forms the bottom of the spray chamber 11.

One of the problems in obtaining proper collection of the phosphorus is to provide for the treatment of a large volume of gases and vapors moving at relatively high velocity in order to conserve the size of the units used, and at the same time to provide quiet settling zones which will permit the phosphorus to collect and to cool without being subjected to turbulent currents of cooling liquid. Because the base of the inverted cone which forms the bottom of the spray chamber is located well below the surface of the liquid in the receiving tank, the drops of falling cooling liquid always strike a surface of liquid at the lower end of the spray chamber which is of a maximum area. Yet the sloping walls of the conical bottom tend to concentrate the phosphorus-containing liquid into a relatively small outlet which, as will be later apparent, directs the phosphorus containing liquid towards the locus in which the settling is consummated.

The receiving tank 19 is formed with cylindrical side walls 22 and a conical bottom 23 which is in the form of an inverted cone having an apex 24 in which is adapted to collect the liquid phosphorus. The temperature of the cooling water and the speed of flow of the phosphorus-containing gases and the other factors are so regulated that the phosphorus shall remain in liquid form at the apex 24 of the conical bottom 23, from which it may be withdrawn by a pump (not shown) to storage, or further treatment. The phosphorous in liquid form is withdrawn through the pipe 24'.

The interior of the receiving tank 19 is lined with an acid-resisting brick 25. The acid-resisting brick 25 is built up into a circular wall at 26 and so constructed as to form a trough 27. This construction provides an overflow trough into which the cooling liquid overflows from the receiving tank 19. The cooling liquid containing the molten phosphorus passes down through the outlet 21 and is directed towards the apex 24 of the conical bottom 23 of the receiving tank 19.

A relatively large volume of cooling liquid is circulated through the receiving tank and the spray chamber, but it will be noted that because of the path in which this liquid is directed and by reason of the fact that there is a large cross sectional area of liquid adjacent the lower end of the outlet 21 of the spray chamber, the liquid is not turbulent at this point and there can be, and is, an efficient settling of the liquid phosphorus into the apex 24 of the conical bottom 23. This construction permits a large volume of cooling liquid to be employed and yet provides a quiescent zone in which the liquid phosphorus may accumulate. The liquid phosphorus is but relatively slightly disturbed in its travel to 24 because of the comparative lack of turbulence of the cooling liquid either in the bottom of the spray chamber, or in the zone adjacent and below the outlet from the spray chamber.

The overflow trough of the receiving tank communicates with a conduit 28, which likewise connects with a downwardly directed inlet pipe 29, which latter passes through a cover 30 of an overflow tank 31 that is adapted to catch the overflow of the cooling liquid from the receiving tank 19. The receiving tank 19 is likewise provided with a cover 32, as shown in the drawings.

In the cover 30 is provided a manhole 33 (see Fig. 5). Mounted around the edge of the manhole 33 is a trough 34 adapted to be partially filled with a sealing liquid 35. There is a manhole cover 36 that has a downwardly extending lip 37 that fits within the trough 34, and is adapted to have its lower edge pass below the surface of the sealing liquid 35. This construction provides an airtight fit for the overflow tank, yet should there be violent fluctuations in the pressure of the gases and vapors, as sometimes occurs under the best possible operating conditions, the manhole cover will permit escape of the high pressure gases generated with a minimum of damage to the apparatus. At the same time, and most importantly, the access of oxygen to the cooling liquid is prevented.

Within an aperture in the cover 30 of the overflow tank, there is provided a downwardly extending telltale casing 38 whose lower, open end is near a bottom wall 39 of the overflow tank. In this telltale casing I have a telltale which comprises a float 40 and an indicating rod 41. This arrangement permits the operator to ascertain the height of the cooling liquid in the overflow tank, yet it allows only a minimum of access of oxygen to the cooling liquid, since the only oxygen-exposed surface of the cooling liquid is that which lies within the telltale casing 38, and this liquid is, moreover, subject to but slow displacement from the cooling liquid in the overflow tank.

Conduit 42 carries the cooling liquid from the overflow tank to an overflow ditch 43. In the spray catching tank 15 I have provided flushing nozzles 44 which may be used to flush out the spray catching tank 15 and the conduit 16, when desired, with hot liquid to prevent accumulations on the interior surface. I have not shown connections to the nozzles 44, in order to simplify the showing.

The conduit 16 from the spray catching tank 15 leads to the bottom of a second spray chamber 45 similar in construction to the spray chamber 11. The spray chamber 11 and accompanying apparatus I have designated in the drawings, Figure 1, as No. 1 condenser. Phosphorus in liquid form is collected at the bottom of a receiving tank 46 and is pumped out to storage, or further treatment. This combined receiving tank and spray chamber is designated on the drawings as No. 2 condenser.

An outlet conduit 47 from the spray chamber 45 leads to the bottom of a spray chamber 48. The vapors and gases now have a relatively small percent of phosphorus in them, and pass upwardly in the spray chamber 48 to a point near the top, while being subjected to sprays which still further reduce the phosphorus content of the gases and vapors. It is to be noted that the volume of the gases and vapors has also been materially reduced by reason of the cooling to which the gases and vapors have been subjected. The cooling liquid with the entrained phosphorus passes out through a conduit 50 at the bottom of the condenser 48, and into a receiving tank which I have designated by the numeral 51, from whence it overflows through a conduit 52 into a receiving trough 53, from whence it passes into a conduit 54 which leads to the cooling system to be later described. The combined spray chamber 48 and receiving tank 51 I designate on the drawings as No. 3 condenser.

From the top of the spray chamber 48 the gases and vapors pass through a conduit 56 to the bottom of a spray catcher 57. The conduit 56 is adapted to deliver the gases and vapors substantially tangentially against the interior walls of the spray catcher 57. The spray catcher 57 is provided at its top with an outlet conduit 58 through which the gases pass out, and may be then employed for combustion purposes. The dotted arrows indicate that the gases follow a tortuous path in the spray catcher and the entrained cooling liquid droplets are caught in this part of the apparatus. The liquid can be withdrawn from the bottom through pipe 57' and returned to the receiving tank 51.

It is a very important feature of this system that the gases be de-oxidized initially and kept de-oxidized throughout the operation, otherwise phosphorus oxide sludges are formed in the apparatus which not only reduce the yield, but clog the apparatus. The cooling system in which I employ a cooling liquid is described in the co-pending application of Kerschbaum and Gooch, Serial No. 680,504. This application shows the method which I employ to obtain this initial de-oxidation of the cooling fluid and its continuous de-oxidation during use.

In the cooling system shown in the drawings, Figures 1 and 7, I employ a vacuum evaporator for cooling and de-oxidizing. This is of a well known type using steam jets to obtain a vacuum, (not shown for purposes of simplicity in description). The vacuum draws out of the cooling liquid dissolved gases, reducing the oxygen content to a desirable minimum. The cooling liquid is de-oxidized prior to its introduction into the condensers 1, 2 and 3, and by the operation of the vacuum evaporator I maintain the cooling liquid cool and relatively oxygen free during operation of my system. It is to be understood that the particular cooler is no part of this invention so long as it performs the function of de-oxidizing and cooling. In the drawings I have designated the cooler by the numeral 100, and it is entitled on the drawings "Vacuum evaporator for cooling and de-oxidizing".

I have shown in the drawings two overflow tanks for the No. 1 condenser, the overflow tank 31 previously described, and a similar overflow tank 101. For the No. 2 condenser I have shown an overflow tank of similar construction 102. Both overflow tanks 101 and 102 may discharge into the overflow ditch 43. The overflow tank 102 may discharge also into a conduit 103 provided with a valve 104 from whence the liquid passes to a storage tank 105. From the storage tank 105 the cooling liquid is drawn through an outlet conduit 106 and discharged at 107 into the vacuum evaporator 100.

Vapors from the vacuum evaporator pass to a condenser 108 where they are condensed and are discharged through a conduit 109 to a suitable drainage ditch 110. In the vacuum evaporator 100 the cooling liquid, which may comprise an aqueous medium of acidity from say approximately $\frac{1}{10}$-normal to 1-normal, is de-oxidized and cooled and flows out through a discharge conduit 111 which feeds conduits 112 and 113 through valves 114 and 115, respectively. The conduits 112 and 113 lead to centrifugal pumps 116 and 117, respectively, through which cooling liquid is sprayed into the top of the spray chamber 45 of the No. 2 condenser.

When the plant is once on stream, the cooling liquid is recirculated along the path previously indicated. At the time of starting the plant, the storage tank 105 is fed through a conduit 118 controlled by a valve 119 which initially charges the storage tank with cooling liquid so that it can be de-oxidized prior to the introduction of the cooling liquid into the cooling system comprising the condensers No. 1, No. 2 and No. 3.

There is provided a branch pipe 120 which connects with the output pipe from pump 117 which supplies cooling liquid to the sprays for the spray chamber 48 of the No. 3 condenser.

In order to furnish cooling liquid for the No. 1 condenser, I have shown a draw-off line 121 from the receiving tank 51 for the No. 3 condenser. This draw-off line is provided with a valve 122 through which the cooling liquid passes. A pump 123 discharges into a line 124 from whence extends a branch line 125 leading to the receiving tank 46 for the No. 2 condenser, and branch line 126 leading to the receiving tank 19 of the No. 1 condenser equipment. Control valves 127 and 128 are located respectively in the lines 125 and 126. Through the line 126 cooling liquid sufficient for No. 1 condenser to start operation can be supplied. Intermittently and from time to time as the cooling liquid in the No. 1 condenser system needs replenishment, this can be effected through line 126. The cooling liquid for the No. 1 condenser is supplied in general through a closed cycle which comprises conduits and pump mechanisms 130 and 131, withdrawing from overflow tanks 31 and 101, respectively, of the No. 1 condensing system, and discharging the cooling liquid to the sprays for the spray chamber 11. I have not endeavored to show all of the necessary valves, and the detailed connections, in order to reduce the complication of the description as much as possible.

By my combined spray chamber, receiving tank, spray catcher and overflow tank arrangements I have provided means for treating large volumes of gas containing phosphorus vapors flowing at high velocities with large quantities of cooling liquid, while getting high yields of phosphorus with very small formation of objectionable oxides.

While I have shown and described the preferred embodiment of my invention, I wish it to be understood that I do not confine myself to the precise details of construction herein set forth by way of illustration, as it is apparent that many changes and variations may be made therein, by those skilled in the art. without departing from the spirit of the invention, or exceeding the scope of the appended claims.

I claim:

1. In an apparatus for the condensation of phosphorus from the vapor form, a spray chamber having a conical bottom provided with a liquid outlet passage at the apex of the conical bottom, spray means in the top of the spray chamber to spray cooling liquid therein, said spray chamber being provided with an inlet passage for the phosphorus vapors near the bottom thereof, and an outlet passage for the uncondensed vapors and gases near the top thereof, a receiving tank below the spray chamber having side walls and a conical bottom to receive the condensed phosphorus and the cooling liquid from the spray chamber and allow the cooling liquid to collect therein in a quiescent pool, means to withdraw the phosphorus from the conical bottom of the receiving tank, an overflow trough inside of the receiving tank located on the side walls thereof, the upper edge of the overflow trough being sufficiently above the end of the liquid outlet passage from the spray chamber that a quiescent pool is formed in the spray chamber of substantially the diameter of the chamber, and means to withdraw the cooling liquid from the overflow trough.

2. In an apparatus for the condensation of phosphorus from the vapor form, a spray chamber having a bottom in the form of an inverted cone provided with a liquid outlet passage at the apex of the conical bottom, spray means in the top of the spray chamber to spray cooling liquid therein, said spray chamber being provided with an inlet passage for the phosphorus vapors near the bottom thereof and an outlet passage for uncondensed vapors and gases near the top thereof on the opposite side from the inlet passage, a receiving tank below the spray chamber having side walls and a bottom in the form of an inverted cone to receive the condensed phosphorus and the cooling liquid from the spray chamber and allow the cooling liquid to collect therein in a quiescent pool, means to withdraw the phosphorus from the conical bottom of the receiving tank, an overflow trough inside of the receiving tank located on the side walls thereof, the upper edge of the overflow trough being sufficiently above the base of the inverted cone which forms the bottom of the spray chamber that a quiescent pool is formed in the spray chamber of substantially the greatest diameter of that chamber, and means to withdraw the cooling liquid from the overflow trough.

3. In an apparatus for the condensation of phosphorus from the vapor form, a spray chamber having a bottom in the form of an inverted cone provided with a liquid outlet passage at the apex of the conical bottom, spray means in the top of the spray chamber to spray cooling liquid therein, said spray chamber being provided with an inlet passage for the phosphorus vapors near the bottom thereof and an outlet passage for uncondensed vapors and gases near the top thereof on the opposite side from the inlet passage, a receiving tank below the spray chamber having side walls and a bottom in the form of an inverted cone to receive the condensed phosphorus and the cooling liquid from the spray chamber and allow the cooling liquid to collect therein in a quiescent pool, means to withdraw the phosphorus from the conical bottom of the receiving tank, an overflow trough inside of the receiving tank located on the side walls thereof, the upper edge of the overflow trough being at such a height above the base of the inverted cone which forms the bottom of the spray chamber that the spray always falls on an area of water of maximum diameter and a quiescent pool of water is formed in the spray chamber, and means to withdraw the cooling liquid from the overflow trough and recirculate it to the spray means.

4. In an apparatus for the condensation of phosphorus from the vapor form, a spray chamber, spray means therein to spray a cooling liquid on the phosphorus contained vapor, an outlet conduit from the spray chamber into which is adapted to pass phosphorus containing vapors having entrained moisture in drop form, a cylindrical spray catching tank to which the outlet conduit feeds at a low point, said conduit delivering said stream substantially tangentially against the interior walls of the tank, a vapor conduit through which the vapors after their deposition of moisture are adapted to pass, said last mentioned conduit being located above the first mentioned conduit and in staggered relation thereto, and a third conduit leading from a low point in the spray catching tank for returning liquid deposited therein to a locus from which it may be recirculated in the spray chamber.

5. In an apparatus for the condensation of phosphorus from the vapor form, a spray chamber having a conical bottom provided with a liquid outlet at the apex of the conical bottom, spray means in the top of the spray chamber to spray cooling liquid therein, said spray chamber being provided with an inlet passage for the phosphorus vapors near the bottom thereof, an outlet passage for uncondensed vapors and gases near the top thereof, a cylindrical spray catching tank to which the outlet conduit feeds at a low point in that tank, said conduit delivering a stream of phosphorus vapors and gases with entrained moisture droplets therein substantially tangentially against the interior walls of the spray catching tank, a vapor conduit through which the vapors after their deposition of moisture are adapted to pass from the spray catching tank, said last mentioned conduit being located above the outlet conduit from the spray chamber and in staggered relation thereto, a receiving tank below the spray chamber having side walls and a conical bottom to receive the condensed phosphorus and the cooling liquid from the spray chamber and allow the cooling liquid to collect therein in a quiescent pool, means to withdraw the phosphorus from the conical bottom of the receiving tank, an overflow trough inside the receiving tank located on the side walls thereof, the upper edge of the overflow trough being above the outlet passage from the spray chamber, means to withdraw the cooling liquid from the overflow trough, and a return conduit leading from the low point in the spray catching tank for returning liquid deposited therein to the receiving tank.

6. In an apparatus for the condensation of phosphorus from the vapor form, a spray chamber having a conical bottom provided with a liquid outlet at the apex of the conical bottom, spray means in the top of the spray chamber to spray cooling liquid therein, said spray chamber being provided with an inlet passage for the phosphorus vapors near the bottom thereof, an outlet passage for uncondensed vapors and gases near the top thereof and on the opposite side from the inlet passage, a cylindrical spray catching tank to which the outlet conduit feeds at a low point in that tank, said conduit delivering a stream of phosphorus vapors and gases with entrained moisture droplets therein substantially tangentially against the interior walls of the spray catching tank, a vapor conduit through which the vapors after their deposition of moisture are adapted to pass from the spray catching tank, said last mentioned conduit being located above the outlet conduit from the spray chamber and in staggered relation thereto, a receiving tank below the spray chamber having side walls and a bottom in the form of an inverted cone to receive the condensed phosphorus and the cooling liquid from the spray chamber and allow the cooling liquid to collect therein in a quiescent pool, means to withdraw the phosphorus from the conical bottom of the receiving tank, an overflow trough inside the receiving tank located on the side walls thereof, the upper edge of the overflow trough being at such a height above the base of the inverted cone which forms the bottom of the spray chamber that the spray always falls on an area of water of maximum diameter, means to withdraw the cooling liquid from the overflow trough, and a return conduit leading from the low point in the spray catching tank for returning liquid deposited therein to the receiving tank, said return conduit having its end in the return tank at such a distance below the liquid level therein that bubbling due to pressure of gases and vapors in the spray catching tank is avoided, and means to withdraw the cooling liquid from the overflow trough and recirculate it to the spray means.

7. In an apparatus for the condensation of phosphorus from the liquid form, a spray chamber having a conical bottom provided with a liquid outlet passage at the apex of the conical bottom, spray means in the top of the spray chamber to spray cooling liquid therein, a receiving tank below the spray chamber having side walls, an overflow trough inside of the receiving tank located on the side walls thereof, the upper edge of the overflow trough being sufficiently above the end of the liquid outlet passage from the spray chamber that a quiescent pool is formed in the spray chamber of substantially the diameter of the chamber.

8. In a phosphorus condensing apparatus, a spray chamber, a spray catching tank, an outlet conduit from the spray chamber into the spray catching tank which is adapted to pass phosphorus containing vapors having moisture in drop form into the spray catching tank, said conduit leading into the spray catching tank at a low point and delivering said stream of phosphorus containing vapors substantially tangentially against the interior walls of the spray catching tank, and a second conduit at a high point in the spray catching tank serving as an outlet for the gases and vapors from that tank.

STAPLETON D. GOOCH.